United States Patent
Gibas

[11] Patent Number: 5,892,538
[45] Date of Patent: Apr. 6, 1999

[54] TRUE THREE-DIMENSIONAL IMAGING AND DISPLAY SYSTEM

[75] Inventor: Michael Patrick Gibas, Mission Viejo, Calif.

[73] Assignee: Ericsson Inc., Research Triangle Park, N.C.

[21] Appl. No.: 886,086

[22] Filed: Jul. 2, 1997

Related U.S. Application Data

[62] Division of Ser. No. 497,643, Jun. 30, 1995, Pat. No. 5,675,377.

[51] Int. Cl.$^6$ .................................................. H04N 13/00
[52] U.S. Cl. .................................................. 348/43
[58] Field of Search .................... 348/42, 43, 46, 348/47, 51; 345/419

[56] References Cited

U.S. PATENT DOCUMENTS

| | | | |
|---|---|---|---|
| 4,541,007 | 9/1985 | Nagata | 358/3 |
| 4,571,616 | 2/1986 | Haisma et al. | 358/88 |
| 4,905,081 | 2/1990 | Morton | 358/88 |
| 4,957,351 | 9/1990 | Shioji | 350/348 |
| 4,959,641 | 9/1990 | Bass et al. | 340/700 |
| 5,083,199 | 1/1992 | Borner | 358/88 |
| 5,113,213 | 5/1992 | Sandor et al. | 355/22 |
| 5,130,794 | 7/1992 | Ritchey | 348/39 |
| 5,184,232 | 2/1993 | Burney | 359/32 |
| 5,214,419 | 5/1993 | DeMond et al. | 340/794 |
| 5,283,640 | 2/1994 | Tilton | 348/42 |
| 5,333,077 | 7/1994 | Legar et al. | 359/619 |
| 5,361,385 | 11/1994 | Bakalash | 395/124 |
| 5,561,526 | 10/1996 | Huber et al. | 356/376 |

OTHER PUBLICATIONS

*Microlasers*, by Jack L. Jewell, James P. Harbison and Exel Scherer; Scientific American, Nov. 1991; pp. 86 thru 94.

*Primary Examiner*—Bryan Tung
*Attorney, Agent, or Firm*—Jenkens & Gilchrist

[57] ABSTRACT

A scene is imaged from a plurality of points of view to generate plural images each including an image value and distance for each picture element. The images are converted to a principle point of view to generate a non-standard image that accounts for hidden objects in the scene from the perspective of the principle point of view by including multiple image values and distances for each picture element. The non-standard image is then converted to generate a plurality of display images, each having a different display point of view. The display images are individually displayed at corresponding display elements arrayed in a display panel for viewing. A lens at each display element fans out the display image and thus restricts the amount of the image visible at any given perception point to produce true three-dimensional images. An application of the system is disclosed for effectuating a virtual conferencing facility. Furthermore, disclosure is made of the generation or modification of three-dimensional images in the non-standard image format.

4 Claims, 5 Drawing Sheets

TRUE THREE-DIMENSIONAL IMAGING AND DISPLAY SYSTEM

This application is a division of application Ser. No. 08/497,643, filed Jun. 30, 1995, now U.S. Pat. No. 5,675,377.

BACKGROUND OF THE INVENTION

1. Technical Field of the Invention

The present invention relates to three-dimensional imaging systems and, in particular, to the camera systems, image data manipulation systems and image display systems necessary for taking, generating, transmitting and reproducing true three-dimensional images.

2. Description of Related Art

The most commonly recognized example of three-dimensional image perception is that experienced with human vision. Although each eye views the same scene, the horizontal displacement between the eyes allows each eye to view that same scene and any objects located therein from a slightly different perspective. For example, one eye will see slightly more around a corner or curved surface of a viewed object than the other eye. Breaking up the viewed scene into a plurality of picture elements reveals that corresponding elements viewed by each of the eyes are slightly displaced horizontally from one another due to the depth of (or distance to) the object. The brain receives the displaced images from each eye, and compares and combines (i.e., converges) the images to perceive differences in distances between the various objects in the viewed scene. This visual effect is commonly referred to as stereoscopy.

Considerable effort and expense has been invested in the development of methods and systems for processing taken two-dimensional images so as to permit viewers to perceive the taken images in three dimensions. Such methods and systems commonly utilize eye-to-eye parallax to provide depth information by taking two-dimensional images from two slightly different perspectives. The images are individually viewed by different eyes to produce stereoscopic effects by means of blinker-like shields or binocular apparatus worn about the eyes.

As an alternative to separate eye display of the two slightly different perspective two-dimensional images, the images are instead overlaid on each other as an analglyph and displayed on a single screen. The images are separated from each other for human viewing and stereoscopic perception through the use of spectacles having a different coloring or polarizing filter for each eye. In yet another alternative, the two images are alternatively displayed on a single screen with the eyes of the observer alternatively occluded by spectacle mounted shutters actuated in phase with the alternating image display to produce a stereoscopic effect.

Each of the foregoing three-dimensional imaging solutions effectively produces three-dimensional images for viewing, but inconveniently requires the use of some sort of apparatus (like spectacles) to be worn about the eyes of the viewer. A further drawback experienced with such solutions is that the viewer is limited to the point of view from which the images are taken for experiencing the three-dimensional effect. True (i.e., multi-point of view) three-dimensional viewing where the sides of objects as well as objects hidden behind other objects are revealed by lateral viewer movement with respect to the taken images is not possible using any of the foregoing methods.

Three-dimensional images may be produced without use of viewer worn apparatus by means of a parallax barrier strip or sheet of parallel lenticular lenses. In such a system, the differing perspective images are cut into a plurality of vertical columns and interleaved to form a single, combined image. The parallax barrier strip or sheet of parallel lenticular lenses is overlaid on the combined images and functions to restrict each eye to the viewing of a different one of the interleaved images. The viewed images are then converged by the brain to give the perception of depth. This system, however, produces images with a limited viewing angle in that movement of the viewer left or right of off-center produces either a flat image or causes a reversal in the image from orthoscopic to pseudoscopic where the far and near are replaced with each other. The viewing angle limitation of a parallax barrier strip or sheet of parallel lenticular lenses becomes more pronounced when three or more differing perspective two-dimensional images are interleaved to form an autostereogram. Furthermore, true three dimensional perception of the imaged scene is not always possible, or is limited in scope as the images used to construct the combined image are usually taken from the same point of view or very few different points of view.

The foregoing systems and methods for producing stereoscopic three-dimensional photographic images have been extended to video or motion picture images. For example, the outputs of two spaced apart television cameras or motion picture cameras viewing the same scene have been directed to or projected on a display for stereoscopic viewing using binocular, alternating display, filtering or parallax apparatus. Although equally as successful as their photographic counterparts in producing three-dimensional effects, these systems also suffer equally from the same drawbacks as experienced with three-dimensional photographic images, including the limitation concerning the provision of only a single, or very limited number of points of view.

Accordingly, there is a need for an imaging and display system and method for generating true three-dimensional images.

SUMMARY OF THE INVENTION

A scene and the objects located therein are imaged from a plurality of points of view. Each acquired image comprises a plurality of picture elements, with the picture elements including image information concerning the objects in the imaged scene visible from the point of view of that image. The plural images of the scene are converted to a single, non-standard image of the scene from the perspective of a principle point of view. The non-standard image also comprises a plurality of picture elements, however, in this case each picture element is associated with a particular orientation of a scan ray emanating from the principle point of view, and includes image information for each object imaged in the scene located along that orientation of the scan ray. Accordingly, the non-standard image accounts for the presence of all imaged objects in the scene, including those objects which are not necessarily visible from the principle point of view for the non-standard image.

The generated non-standard image is processed and converted from the principle point of view to generate a plurality of display images of the scene from the perspective of a corresponding plurality of display points of view. Each display image comprises a plurality of picture elements, with each picture element comprising image information for only those objects in the scene visible from the corresponding display point of view. The plurality of display images are presented for viewing by an arrayed plurality of display elements in a display panel, each included display element corresponding to one of the plurality of display points of view. Each display element includes a lens for fanning out the display image and thus limiting the number of picture elements in the display image visible from any one given perspective of a viewer. As the viewer moves laterally with respect to the display panel and the perspective accordingly changes, different picture elements in the plurality of display images become visible through the lenses of the display elements thus allowing different points of view of the scene to be perceived by the viewer in three dimensions.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF EMBODIMENTS

Figure 1:
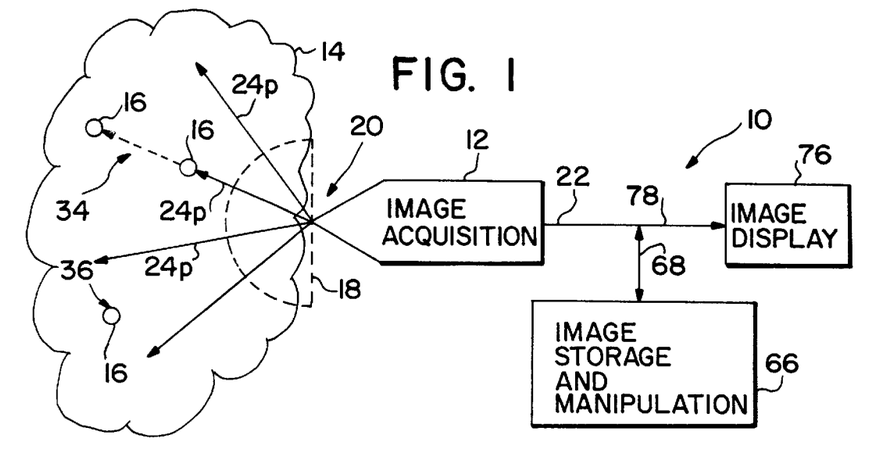
FIG. 1 is a block diagram of a true three-dimensional imaging and display system in accordance with the present invention.

Referring now to FIG. 1, there is shown a block diagram of a true three-dimensional imaging and display system 10 in accordance with the present invention. The system 10 includes an image acquisition device 12 for simultaneously taking full field of view 18 images of a scene 14 (containing objects 16) from multiple points of view (not shown, see FIG. 4). By "objects" 16 it is meant to include not only distinct objects (e.g., two trees), but also distinct features or parts of a single object (e.g., two leaves on a tree, or two different features on a single leaf). The taken multiple point of view images are converted (composed) by the image acquisition device 12 to generate a single, non-standard, full field of view 18 image of the scene 14 and all its included imaged objects 16 (as well as backgrounds in the scene 14—not shown) from the perspective of a chosen principle point of view 20.

The non-standard image is output from the image acquisition device 12 on communications link 22 for further processing and true three-dimensional display as will be described in more detail herein. The communications link 22 comprises either a wireline link, a network (WAN, LAN, telephone) communications link, or a radio frequency (television, microwave) communications link as needed and having sufficient bandwidth for the particular application of the system 10.

Figure 2:
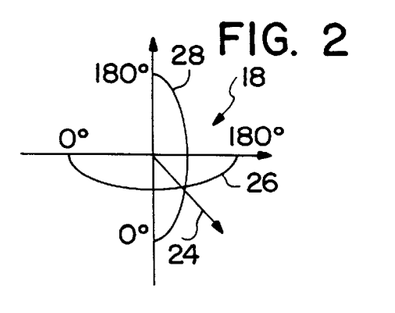
FIG. 2 illustrates a scan ray for three-dimensional image acquisition.
Figure 3:
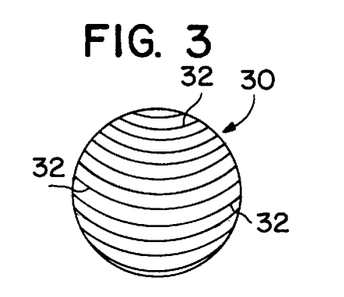
FIG. 3 illustrates the scanning of a hemisphere by the scan ray of FIG. 2.

Reference is now made to FIGS. 2 and 3. By "full field of view" 18 imaging it is meant that image information is acquired by the image acquisition device 12 from each point of view by scanning a scan ray 24 over the scene 14 one hundred eighty degrees in both the horizontal 26 and vertical 28 directions. Imaging in this manner results in the scanning of a three-dimensional space represented by a hemisphere 30. The hemisphere 30 is scanned from left to right along horizontal arcs 32 in raster fashion from top to bottom. Each image of the scene 14 acquired by full field of view 18 imaging from any of the multiple points of view comprises a plurality of picture elements, with each picture element being associated with a particular orientation of the scan ray 24 and, with each picture element including image information for the scene 14 along the corresponding scan ray 24 orientation (see, FIG. 1).

It will be noted that with raster scanning of the hemisphere 30 there will be more picture elements along arcs 32 located near the center of the hemisphere than there are picture elements along arcs located closer to the top and bottom of the hemisphere. Theoretically, the top and bottom arcs 32 will have only a single picture element. As a matter of practice, however, the first and last few arcs 32 and side edges of the hemisphere 30 may not be scanned at all by the image acquisition device 12 because it is unlikely that such information will be either useful to a viewer or used in subsequent image manipulation or display.

Figure 16:
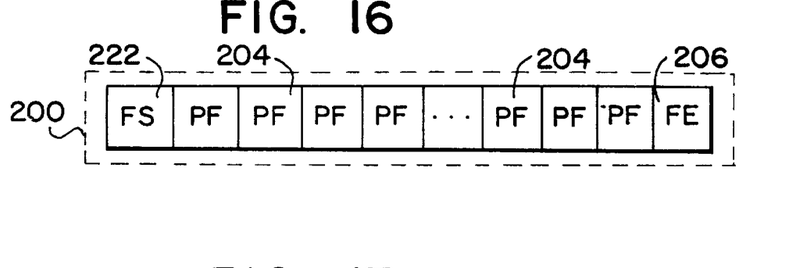
FIG. 16 illustrates the format of the data for output images.

Referring now also to FIG. 16, each image may be represented as a frame 200 of data. When multiple images are taken and sequentially output (for example, in the case of video imaging), corresponding multiple frames 200 of data are sequentially generated (see, FIG. 19A). Each frame 200 of data includes a frame start (FS) 202 followed by a plurality of pixel fields (PF) 204 each containing image data for a corresponding picture element in the image. For a conventional or standard image, each pixel field 204 includes data relating to the color 208 (red, green and blue in a color image; or gray scale in a monochrome image) and intensity 210 of the picture element for the closest imaged object along the corresponding scan ray 24 (see, FIG. 17). Because raster scanning is being performed, the first pixel field 204 in the frame 200 contains the image data for the top and left-most picture element in the image. The next pixel field 204 contains the image data for the next picture element, and so on, arc 32 by arc through the hemisphere 30, until the last pixel field is reached containing the image data for the bottom and right-most picture element in the image. A frame end (FE) 206 may, but need not necessarily, follow the last pixel field 204 signifying the end of the frame 200 of data for that one image.

Figure 18:
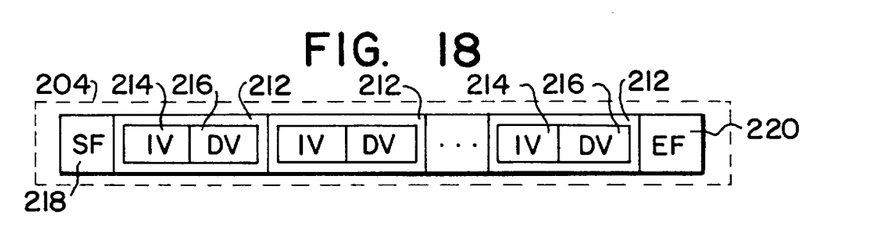
FIG. 18 illustrates the format of the pixel field for a non-standard image in accordance with the present invention.

Referring now again to FIG. 1, and also to FIG. 18, the non-standard, full field of view 18 image of the scene 14 from the principle point of view 20 generated and output by the image acquisition device 12 has the same data format including a sequential plurality of pixel fields 204 as illustrated in FIG. 16. Accordingly, each image comprises a plurality of picture elements as discussed above, with each picture element being associated with a particular orientation of a principle scan ray 24p emanating from the principle point of view 20. In the case of this non-standard image, however, instead of being defined by image information for only the nearest object, as is conventional, the pixel field 204 for each picture element is instead defined by at least one (and often more than one, as shown) image and distance value pair 212. The image value (IV) 214 in each included pair 212 provides image data (e.g., color 208 and intensity 210) relating to an object 16 in the scene 14 located along the particular orientation of the principle scan ray 24p corresponding to that picture element. The associated distance value (DV) 216 in each included pair provides a distance (most likely expressed in a logarithmic, exponential, or other non-linear scale) to that object 16 along the principle scan ray 24p emanating from the location of the principle point of view 20.

Multiple image and distance value pairs 212 for a single picture element are generated in the output non-standard image for a single orientation of the principle scan ray 24p (i.e., in a single pixel field 204) to account for instances wherein multiple objects 16 in the scene 14 are located along a particular orientation of the principle scan ray 24p (as generally indicated at 34 in FIG. 1) extending from the location of the principle point of view 20. For example, given the orientation of the principle scan ray 24p illustrated at 34, the pixel field 204 for the picture element corresponding to that orientation includes one image and distance value pair 212 for each of the two objects 16 located along the scan ray, as well as a third image and distance value pair for the background (not shown) behind the objects. Thus, even though not visible from the principle point of view 20, image and distance values 214 and 216 for the sides 36 of objects 16 and the hidden objects (including backgrounds) located behind visible objects are obtained by the image acquisition device 12 from the other points of view (not shown), converted by the image acquisition device to the principle point of view, and then output in the generated non-standard image to provide a true three-dimensional image of the scene 14. In order to differentiate one pixel field 204 from a next pixel field, and thus associate image and distance value pairs 212 with the correct picture element, each pixel field is formatted to include a start field (SF) 218, and may also include an end field (EF) 220. Because more than one image and distance value pair 212 may be output on communications link 22 for each picture element (i.e., principle scan ray 24p orientation and/or pixel field 204), it will, of course, be understood that the generated non-standard image is unconventional in nature and is therefore not readily displayable for viewing using conventional means. As will be discussed in connection with FIGS. 9–13, viewing of the non-standard image requires special handling of the instances wherein a single picture element includes more than one image and distance value pair.

Figure 4:
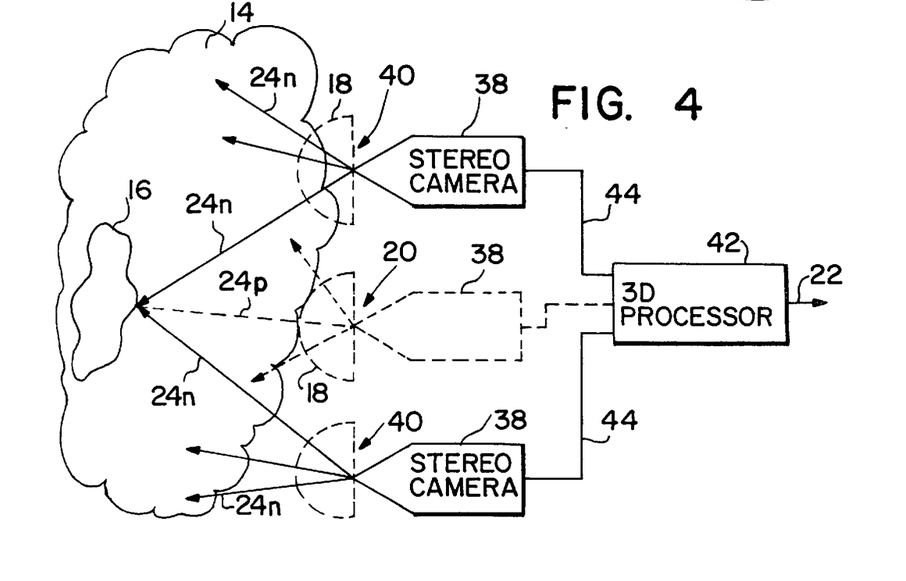
FIG. 4 is a block diagram of a true three-dimensional image acquisition apparatus.

Reference is now made to FIG. 4 wherein there is shown a block diagram of the image acquisition device 12 comprising a plurality (two shown) of stereo cameras 38 positioned at selected different, non-principle points of view 40 and connected to a three-dimensional imaging processor 42 via communications links 44. Each of the included stereo cameras 38 takes and outputs full field of view 18 images of the scene 14 from its particular point of view 40. The images output by the stereo cameras 38 have the format illustrated in FIG. 16. Accordingly, each image comprises a plurality of picture elements, with each picture element being associated with a particular orientation of a non-principle scan ray 24n emanating from the point of view 40 of the stereo camera. Because the imaging performed is conventional in nature, each picture element output from a camera 38 has a pixel field 204 defined by only a single image and distance value pair 212. The included image value 214 in the pair provides image data (e.g., color and intensity) for the nearest object 16 located along the particular orientation of the non-principle scan ray 24n corresponding to that picture element. The associated distance value 216 in the pair provides a distance to that nearest visible object 16 along the non-principle scan ray 24n emanating from the location of the point of view 40. No information (image or distance) is obtained for the sides of objects and the hidden objects (including backgrounds) which are obstructed from view by the nearest visible objects imaged at the non-principle points of view 40. Image information for these objects is instead obtained by stereo cameras 38 positioned at other non-principle points of view 40.

The three-dimensional imaging processor 42 receives the images (i.e., image and distance value pairs 212 for the pixel fields 204 of the picture elements) output by the plural stereo cameras 38, and through a process referred to herein as "ray projection" converts the plural images of the scene 14 taken from the non-principle points of view 40 to generate the single, non-standard, full field of view 18 image of the scene from the perspective of the principle point of view 20. In the ray projection process, each orientation of a non-principle scan ray 24n is matched (as closely as possible) to a corresponding orientation of the principle scan ray 24p. Thus, picture elements and pixel fields 204 in one image from the non-principle point of view are matched to picture elements (and pixel fields) in the image from the principle point of view. Next, the image and distance value pairs 212 associated with each of the orientations of the non-principle scan rays 24n (pixel fields 204 for the picture elements) are associated with the matching orientations of principle scan ray 24p (pixel fields for the picture elements). This process of matching the orientations of the scan rays 24 and associating the image and distance value pairs to principle scan ray orientations is repeated across the full field of view 18 to obtain image information for all orientations of the principle scan ray 24p. The generated and output non-standard image resulting from this process has the format illustrated in FIGS. 16 and 18, and thus includes image information for all objects 16 imaged by the plurality of stereo cameras 38 (including hidden objects, backgrounds and object sides not necessarily visible from the location of the principle point of view 20).

Figure 20:
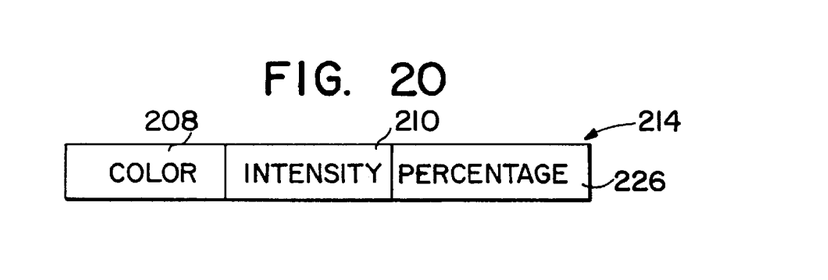
FIG. 20 illustrates the format for the image value field.

It will, of course, be understood that often times the various orientations of the principle and non-principle scan rays 24p and 24n at a given object 16 will not match exactly. When this occurs, one available option is to select the closest orientations of the scan rays 24 as matches. The image information in the pixel fields 204 for those closest orientations is then associated as described above. Alternatively, the image information (pixel fields 204) associated with all of the closely, but not necessarily exactly, matching orientations of the non-principle scan rays 24n is combined to generate a combination image and distance value pair 212 that is associated with the determined matching orientation of the principle scan ray 24p and its pixel field 204. The combination of image information from several picture elements is performed in accordance with well known pixel correlation and processing techniques. In this case, as shown in FIG. 20, the image value 214 of the image and distance value pairs 212 may also include data relating to the percentage 226 that the image information from the non-principle point of view 40 fills the image information of the concerned pixel field 204 for the principle point of view 20.

Figure 5:
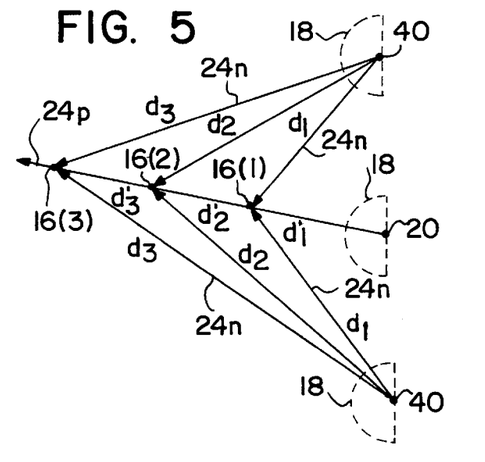
FIG. 5 illustrates the ray projection process utilized to convert non-principle point of view images to the principle point of view.

Referring now to FIG. 5, three objects 16(1)–16(3) are shown being imaged from two non-principle points of view 40 by the illustrated orientations of non-principle scan rays 24n. The image information generated for these orientations of the non-principle scan rays 24n comprises one image and distance value pair per illustrated orientation. In accordance with the ray projection process, a determination is first made of the particular orientation of the principle scan ray 24p emanating from the principle point of view 20 matching to the orientations of the non-principle scan rays 24n. Next, the measured distances (d) to the objects 16(1)–16(3) from the non-principle points of view 40 along scan rays 24n are converted to distances (d') along the identified matching orientation of the principle scan ray 24p emanating from the principle point of view 20. This distance correction accounts for the displacement of the locations of the non-principle points of view 40 away from the location of the principle point of view 20. The original image values along with the converted distances for the objects 16(1)–16(3) are then associated with the illustrated orientation of the principle scan ray 24p. Thus, in the generated non-standard image output from the processor 42, the ray projection process produces a picture element for the illustrated orientation of the principle scan ray 24p that includes at least three image and distance value pairs corresponding to the three objects 16(1)–16(3), as well as a fourth image and distance value pair for the background behind the three objects. To generate the non-standard image for the full field of view 18, the foregoing process is repeated across the full field of view 18 such that at least one image and distance value pair is generated for every orientation of the principle scan ray 24p.

Referring now again to FIG. 4, although a stereo camera 38 need not necessarily be positioned at the principle point of view 20 (resulting in virtual imaging from the perspective of the principle point of view 20 as discussed above), placement of a stereo camera 38 at that location (as generally illustrated by broken lines in FIG. 4) may facilitate the generation of the non-standard image. The stereo camera 38 positioned at the principle point of view 20 outputs an image and distance value pair for the visible objects along every orientation of the principle scan ray 24p in the full field of view 18. Advantageously, a majority of the objects within the scene 14 are imaged by the stereo camera 38 from the principle point of view 20, and thus the image information relating to these objects need not necessarily be obtained by other stereo cameras 38. Only that limited amount of image information collected by the stereo cameras 38 at the non-principle points of view 40 and relating to any hidden objects, backgrounds or sides of objects in the scene 14 not visible from the perspective of the principle point of view 20 need be collected and processed into principle point of view image information by the processor 42 in accordance with the ray projection process to generate the non-standard image.

Figure 6:
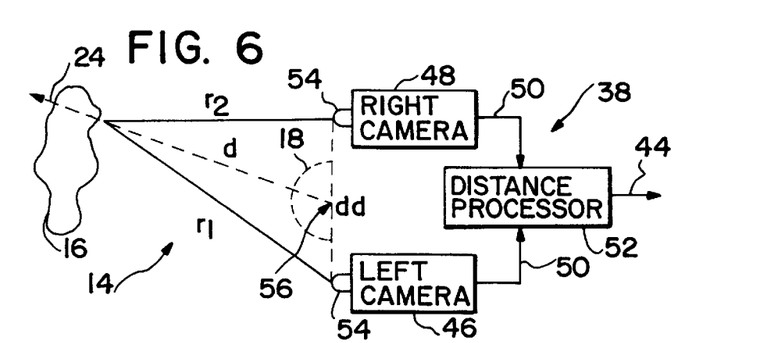
FIG. 6 is a block diagram of a stereo camera in the image acquisition apparatus.

Referring now to FIG. 6, there is shown a block diagram of the stereo camera 38 comprising a left camera 46 and a right camera 48 connected via communications links 50 to a distance processor 52. The cameras 46 and 48 each include a bubble (or fish-eye) lens 54 to facilitate imaging of the scene 14 over the full field of view 18. It will, of course be understood that lenses with smaller fields of view may be used if desired for the lens 54. The cameras 46 and 48 are slightly displaced in a horizontal direction from one another by a predetermined displacement distance (dd) to induce parallax in the images taken by the cameras. The midpoint between the cameras 46 and 48 identifies the location 56 of the particular point of view of the stereo camera 38.

Figure 17:
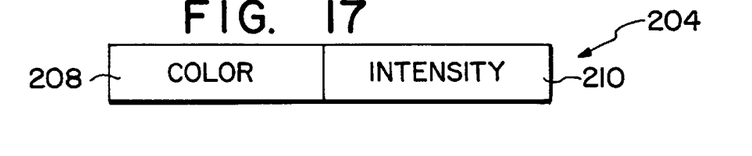
FIG. 17 illustrates the format of the pixel field for a conventional standard image.

The distance processor 52 receives a full field of view image taken by each of the left and right cameras 46 and 48, respectively, in the format illustrated in FIGS. 16 and 17, and processes the images to determine a distance (d) along the scan ray 24 emanating from the location 56 to each of the nearest visible imaged objects 16 over the full field of view 18. The distance processor 52 first finds a common picture element (pixel field 204) between the two taken images and identifies the imaging rays r1 and r2 emanating from the cameras 46 and 48 and pointing at that common picture element. The imaging rays r1 and r2 along with the displacement distance (dd) define a triangle. The orientation (i.e., compound angle) of the imaging rays r1 and r2 and the displacement distance (dd) are known quantities from which the distance (d) to the visible object 16 at the common picture element may be determined by the processor 52 using trigonometry. This distance calculation is made by the processor 52 for each common picture element identified between the two taken images. The distance value 216 (see FIG. 18) comprises the distance (d) to the object which will most likely be converted to a logarithmic, exponential or other non-linear scale because a difference of one foot is more significant to the three dimensional effect for close objects than it is for distant objects. The processor 52 thus generates and outputs an image and distance value pair 212 for each picture element comprising the picture element image value 214 and the calculated distance (d) value 216 in association with each corresponding orientation of the scan ray 24 (pixel field 204).

It will, of course, be understood that often times the orientations of the imaging rays r1 and r2 at a given object 16 will not match exactly with each other to define the orientation of the scan ray 24 and produce the image information. When this occurs, the image information associated with all of the closely, but not necessarily exactly, matching orientations of the imaging rays r1 and r2 can be combined to generate a combination image and distance value pair 212 that is associated with the scan ray 24. The combination of image information from several picture elements (pixel fields 204) is performed in accordance with well known pixel correlation and processing techniques. In this case, as shown in FIG. 20, the image value 214 of the image and distance value pairs 212 may also include data relating to the percentage 226 that the image information from the non-principle point of view 40 fills the image information of the concerned pixel field 204 for the principle point of view 20.

Figure 7A:
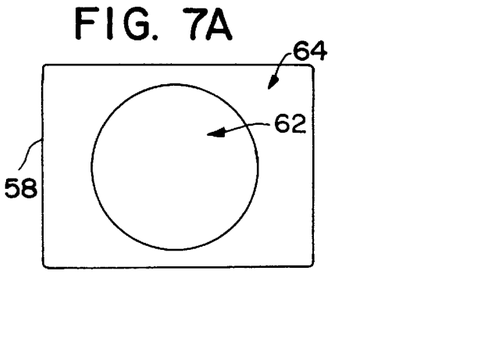
FIGS. 7A and 7B are diagrams representative of the shape of the images generated by the cameras.
Figure 7B:
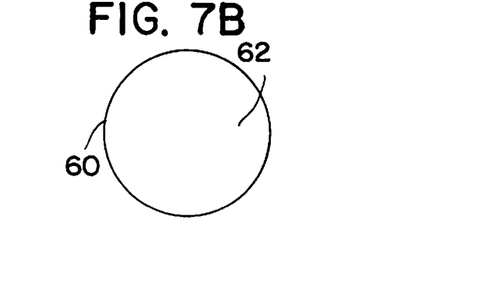

Reference is now made to FIGS. 7A and 7B wherein there are shown diagrams representative of the general shape of the images generated by the cameras 46 and 48 of the scene 14. As illustrated in FIG. 7A, if conventional imaging cameras are used for the cameras 46 and 48 of the stereo camera 38 a rectangular image 58 is generated. In FIG. 7B, the use of custom bubble lens imaging cameras for the cameras 46 and 48 of the stereo camera 38 generates a circular image 60. The images 58 and 60 each comprise a circular portion 62 wherein imaging information concerning the scene 14 is contained as focused thereon by the bubble lens 54. The rectangular image 58 further includes a remaining area 64 containing no image information at all concerning the imaged scene 14.

Cameras 46 and 48 that are custom designed for bubble lens application will efficiently operate to scan only in, and generate image data only for the circular portion 62 as shown in FIG. 7B. This data is transmitted over communications link 50 to the processor 52. Conventional cameras 46 and 48 adapted to use a bubble lens 54, however, will scan the entire image 58 as shown in FIG. 7A, and thus will generate image data for the remaining area 64 as well as the circular area 62. In order to efficiently process the data output from a conventional camera, the distance processor 52 is programmed to ignore image data for the remaining area 64 and only processes that image information associated with the circular portion 62 of the image 58.

Reference is now again made to FIGS. 4 and 6. The communications link 44 connecting the three-dimensional processor 42 to the distance processor 52 of the stereo camera 38, and the link 50 connecting the cameras 46 and 48 to the distance processor, each comprise a uni-directional image channel for carrying image information. In the link 44, such information comprises image and distance value pairs transmitted from the distance processor 52 to the three-dimensional processor 42 for each orientation of the scan ray 24 in the full field of view 18. In the link 50, such information comprises an image value transmitted from the cameras 46 and 48 to the distance processor 52 for each orientation of the scan ray 24 in the full field of view 18.

The links 44 and 50 may also include a control channel over which control commands are transmitted between the various included components of the image acquisition device 12. Such control commands are used to direct the operation of the components of the image acquisition device 12 in its processing of the images obtained of the scene 14 by the stereo cameras 38. The commands are especially useful in directing the operation of the stereo cameras 38 positioned at locations other than the location of the principle point of view 20 to acquire image data concerning hidden objects and the sides of objects not visible from the principle point of view. For example, the three-dimensional processor 42 may use the control channel of links 44 and 50 to command the cameras 46 and 48 to acquire image information concerning hidden objects and sides by directing camera imaging along certain orientations of the principle scan ray 24p emanating from the principle point of view 20. Alternatively, the three-dimensional processor 42 may utilize the control channel to instruct the distance processor 52 to process and/or transmit image information concerning only certain portions of the scene 14 (for example, image information along certain orientations of the principle scan ray 24p) to supplement the image information acquired from the principle point of view 20 and thus account for hidden objects and object sides.

The images of the scene 14 may be acquired by the image acquisition device 12 in either color or black and white. When color imaging is used, it will be understood that the image value output from the cameras 46 and 48 or included in each image and distance value pair associated with a particular orientation of the scan ray 24 and output from either the distance processor 52 or the three-dimensional processor 42 includes a red value, a green value and a blue value. These color values comprise intensity levels for the light in each of the particular primary colors necessary for producing a particular color for and intensity of the picture element relating to the imaged object. Monochromatic imaging, on the other hand, generates a single image value (gray scale) for each picture element.

It will further be understood that the image acquisition device 12 may be used to acquire either individual true three-dimensional images (i.e., photographs) or sequences of true three-dimensional images (i.e., videos). The acquisition of video images from the multiple points of view 40 and their conversion through the use of ray projection processing to the principle point of view 20 need not necessarily be performed in real time unless instantaneous subsequent three-dimensional (i.e., live) recording and display of the video images is desired. As discussed above, the placement of a stereo camera 38 at the location of the principle point of view 20 may facilitate the real time processing required for true three-dimensional video imaging of live events.

Figure 19A:
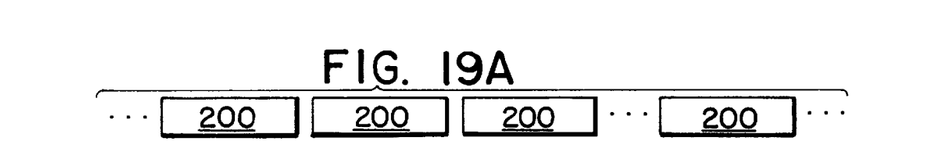
FIGS. 19A and 19B illustrate the format for the data transmission of video images.
Figure 19B:
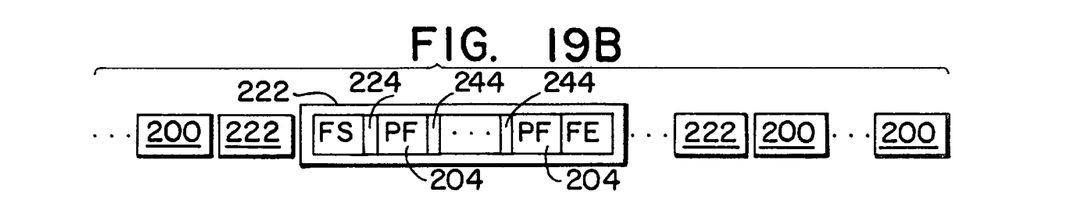

The data format for video images output by the image acquisition device 12 (FIG. 1) comprises a plurality of the frames 200 (FIG. 16) output in a sequence. Typically, as shown in FIG. 16 each frame 200 comprises a pixel field 204 for each picture element in the images. Thus, the video images have a format as shown in FIG. 19A comprising a sequence of full frames 200. However, this is a substantial amount of data requiring a very high bandwidth transmission. To reduce the bandwidth requirements, as illustrated in FIG. 19B, in an alternative format the data transmission includes periodic transmissions of frames 200 comprising pixel fields 204 for each picture element in an image. The data transmitted between these "full" frames 200 comprises partial frames 222 including pixel fields 204 for only those picture elements in the image that have changed. By "changed" it is meant that the image information for that picture element has changed from the prior image. In order to identify the particular picture element to which a pixel field 204 in a partial frame 222 belongs, each pixel field includes a location 224 (in either coordinates or relative measure) of the picture element in the image that has changed. Also, to further reduce bandwidth requirements, data compression may be performed in accordance with well known data compression techniques.

Reference is now again made to FIG. 1 wherein the true three-dimensional imaging and display system 10 of the present invention further includes an image storage and manipulation device 66 connected to the communications link 22 via a bi-directional communications link 68. The image storage and manipulation device 66 receives and manages the storage of the non-standard images output on communications link 22 from the image acquisition device 12. The image storage and manipulation device 66 further functions to facilitate user manipulation of the stored non-standard images. Such manipulation includes the modification of images in, the addition of images to, or the deletion of images from the device 12 output non-standard images.

For modified and added images, the image storage and manipulation device 66 functions in response to user input to create the desired images in true three-dimensional format (like that generated by the image acquisition device 12 and illustrated in FIGS. 16, 18 and 19A–19B). Thus, each created image will comprise a plurality of picture elements, with each picture element associated with a particular orientation of the principle scan ray 24p. To account for hidden objects and the sides of objects, and thus provide for a true three-dimensional image, each picture element may, and is likely to, include plural image and distance value pairs as discussed above.

Figure 8:
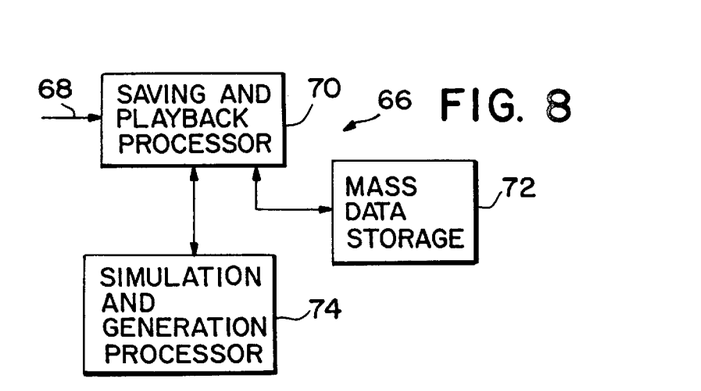
FIG. 8 is a block diagram of a true three-dimensional image storage and manipulation device.

A block diagram of the image storage and manipulation device 66 is shown in FIG. 8. A saving and playback processor 70 connected to the bi-directional communications link 68 functions to control the operation of the image storage and manipulation device 66 for saving non-standard images to, and retrieving non-standard images from a mass data storage device 72. The saved images include images received from the image acquisition device 12 as well as images created by, modified by, or added to by a simulation and generation processor 74.

The simulation and generation processor 74 comprises a user workstation or other processing device responsive to user input and commands for creating images in the non-standard, true three dimensional format (FIG. 18) previously described. In addition to use in image modification, the created images may comprise newly generated complete images for use independent of any images received from the image acquisition device 12. Thus, the simulation and generation processor 74 is useful in one application for creating individual non-standard images for three-dimensional display (perhaps as a sequence of images in a video). Alternatively, the images created by the simulation and generation processor 74 comprise images added to existing images stored in the data storage device 72 and/or received from the image acquisition device 12. Furthermore, the simulation and generation processor 74 operates to modify existing non-standard images to perform image correction or deletion.

The non-standard image creation function performed by the simulation and generation processor 74 of the image storage and manipulation device 66 facilitates use of the true three-dimensional imaging and display system 10 as a previewing device to assist in the visualization of articles prior to construction. For example, an automobile manufacturer could utilize the functionality of the simulation and generation processor 74 to modify a non-standard, true three dimensional image of a current model of an automobile to preview the appearance of the next year's model. Similar image modifications could be used in previewing operations concerning building remodeling and reconstruction, plastic surgery, hairstyling and cutting, and clothing and apparel designing. Such previewing operations could further comprise the creation of a true three-dimensional image of an article from scratch, rather than the modification of an existing image, when a completely new design is being considered.

The simulation and generation processor 74 is further useful in connection with modifying true three-dimensional video images to correct (prior to public viewing) any errors in the imaging process performed by the image acquisition device 12. Furthermore, the processor 74 facilitates the creation of special effects for addition into a previously taken true three-dimensional video image. The processor 74 also enables true three-dimensional simulation of or training in dangerous, expensive or unique and exciting activities without actual participation or cost by generating video images of the activity for user viewing. Such simulation or training activities are particularly useful in flight instruction because current flight simulators do not provide the true three-dimensional images necessary for an accurate simulation. User interaction with the simulation or training images to control operation of the simulation is provided through an appropriate user input (e.g., joystick, steering wheel, etc.) connected to the processor 74 workstation.

In a simulator application, the simulation and generation processor 74 is also useful in building a gaming area database from true three-dimensional images captured by the image acquisition device 12. In such an application, global location coordinates (x, y, z, pitch, roll, and yaw) or similar coordinates would be needed for each image captured by the image acquisition device 12. From this database of image information, true three-dimensional images corresponding to the particular simulation (for example, terrain in a flight or driving simulator) are generated and manipulated in response to user input.

Reference is now again made to FIG. 1 wherein the true three-dimensional imaging and display system 10 of the present invention further includes a true three-dimensional image display device 76 connected to the image acquisition device 12 and the image storage and manipulation device 66 via a communications link 78. The communications link 78 comprises either a wireline link, a network (WAN, LAN, telephone) communications link, or a radio frequency (television, microwave) communications link as needed for the particular application of the system 10.

Figure 9:
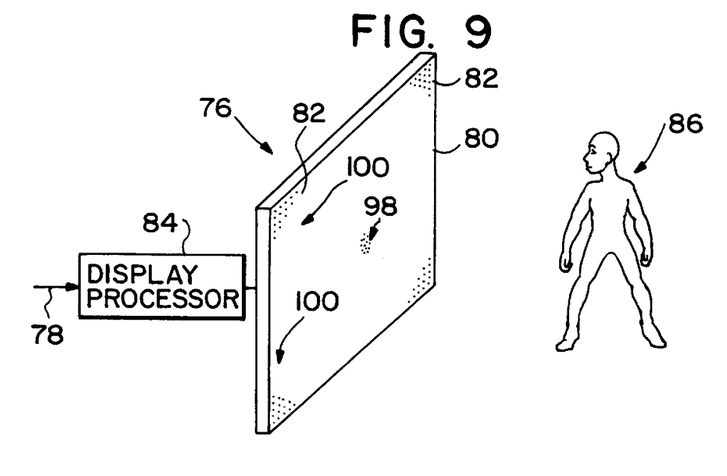
FIG. 9 shows an orthogonal view of a true three-dimensional image display panel.

As shown in FIG. 9, the display device 76 comprises a display panel 80 of a preselected size and shape (rectangular shown) including a plurality of display elements 82 arrayed in a column-by-row matrix. A display processor 84 is connected to control actuation of the individual display elements 82 such that a person 86 looking at the display panel 80 will perceive a true three-dimensional image of the scene much like that experienced by looking out at the scene through a window. Although illustrated as a single unit, it will be understood that the display processor 84 connected to the communications link 78 may instead comprise a plurality of processors arranged in a predetermined hierarchy within a distributed processing architecture. Furthermore, the display panel 80 need not be flat as illustrated, but rather may take on a curved surface and/or be of any selected shape as needed by the particular application.

Figure 10:
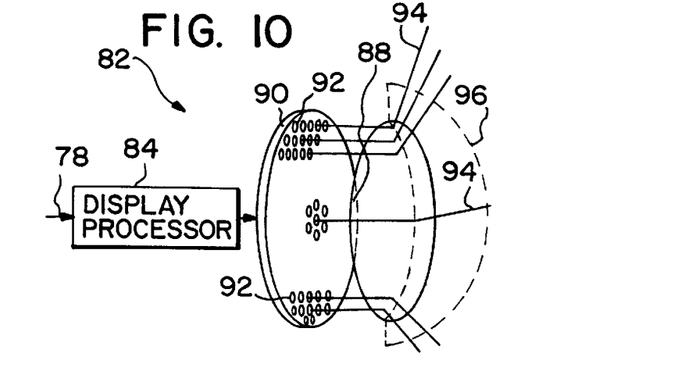
FIG. 10 is a block diagram of an individual display element.
Figure 11:
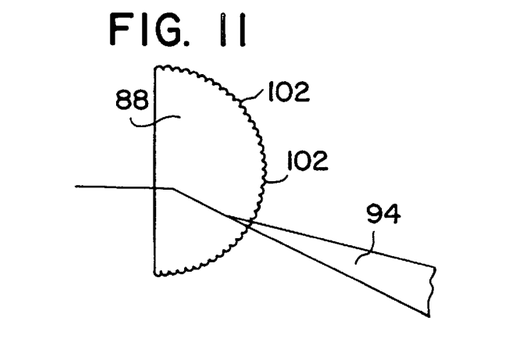
FIG. 11 is a cross-sectional view of the bubble lens for each display element.

Referring now to FIG. 10, there is shown a block diagram of an individual display element 82 in the display panel 80 for displaying a true three-dimensional image. The display element 82 includes a bubble (fish-eye) lens 88 and an associated very small image display comprising a circular shaped microscopic laser array 90 manufactured of a plurality of individual laser sources 92 arrayed in a column-by-row matrix. It will, of course, be understood that lenses with smaller fields of view may be used for the lens 88 if desired. The laser sources 92 each output a display ray 94. The plurality of display rays 94 (comprising together the displayed image) output from the array of laser sources 92 are fanned out by the bubble lens 88 to cover a full (one hundred eighty by one hundred eighty degree) field of view 96. As illustrated in FIG. 11, spreading of the fanned individual collimated laser display rays 94 is accomplished by passing the rays through a plurality of miniature lenses 102 on the surface of the bubble lens 88.

The number of individual laser sources 92 in the laser array 90 for each bubble lens 88 is preferably equal to the number of different orientations of the principle scan ray 24$p$ (see, FIGS. 1 and 4–6) obtained by the image acquisition device 12. Thus, there exists one laser source 92 for each picture element in an image displayed by the display element 82. The use of fewer laser sources 92 in each array 90 of the display elements 82 is permitted, but will adversely affect the overall resolution of the image by the display panel 80.

Figure 12:
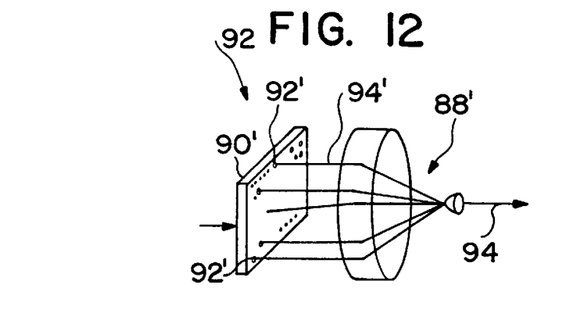
FIG. 12 is a block diagram of an individual laser source in the display element of FIG. 10.

The intensity of the display ray 94 output by each laser source 92 is controlled by the display processor 84. Preferably, the intensity of the laser light emitted from each laser source 92 is controlled by directly controlling the operation of the laser source. Alternatively, as shown in FIG. 12, in the event each individual laser source 92 is not directly controllable as to its intensity, each laser source 92 is constructed of a sub-array 90' of microscopic laser sources 92' that are individually and selectively actuated ("on" or "off") by the processor 84. The plurality of laser beams 94' output by the laser sources 92' are summed as to intensity and collimated by a lens system 88' to generate and output the display ray 94. With selective actuation of the laser sources 92', the intensity of the output display ray 94 is controlled by the processor 84. For example, the individual sources 92' in an sixteen-by-sixteen sub-array 90' could be selectively actuated to provide 256 different intensity levels for the display ray 94 emitted from each laser source 92.

To produce a monochromatic display, the laser sources 92 included in each laser array 90 output the same selected wavelength(s) of light. To produce a color display, on the other hand, one option would be to have three bubble lenses 88 with associated laser arrays 90 for each display element 82. The three laser arrays 90 would separately emit laser light in the three primary colors (red, green and blue) for each display ray 94 with the display processor 84 controlling the intensity of the colors in the display ray 94 emitted by the laser sources 92 to produce a combined light in a selected portion of the visible spectrum. Alternatively, a single bubble lens 88 and associated laser array 90 would be used for each display element as shown in the display of FIG. 10. However, each laser source 92 in such a single laser array 90 would comprise three sub-arrays 90', one for each of the three primary colors, like that shown in FIG. 12. By controlling the intensity of the colored light emitted by the sub-sources in each laser source 94, the display processor 84 would control the color of the emitted display ray 94. In the event red, green and blue laser light cannot be produced, filters in those colors could be used. Also, in an extreme case, it may become necessary, because of the available laser light colors, to choose a different set of primary colors than red, green and blue for the color display. In such a case, the display processor 84 would further perform primary color conversion, or the images would be acquired in the corresponding display colors.

Reference is now made to both FIGS. 9 and 10 for an explanation of the operation of the display processor 84 in processing the non-standard image (FIGS. 16, 18 and 19B) received on communications link 78 to produce a true three dimensional image for viewing on display panel 80. It will be remembered that the non-standard image comprising multiple image and distance value pairs 212 for each picture element is generated by converting images taken from multiple points of view to a principle point of view using a ray projection process. The display processor 84 essentially performs a reverse ray projection process on the non-standard image to produce an image of the scene 14 from the perspective of a slightly different point of view for each one of the plurality of display points of view provided by the display panel 80. In fact, it is preferred, for reasons of providing the best possible resolution in the displayed true three-dimensional image, that each display element 82 on the display panel 80 be considered as providing a separate display point of view for which the processor 84 determines and generates a unique image from the received non-standard image of FIGS. 16, 18 and 19B using reverse ray projection. Each such image that is generated by the display processor 84 is displayed (one picture element—pixel field 204—in the image per laser source 92 in the display element 82) by the display element 82 corresponding to the processor determined display point of view for that image.

To facilitate the reverse ray projection process, a particular one of the display elements 82 in the display panel 80 is selected as the display element located at the principle display point of view 98 (preferably located at or near the center of the display panel). This principle display point of view 98 for image viewing corresponds to the principle point of view 20 of the image acquisition device 12 (FIGS. 1 and 4). Thus, the non-standard image received by the display processor 84 from the perspective of the principle point of view 20 is ready for display by the display element 82 corresponding to the principle display point of view 98. However, only the image value for the nearest object along the scan ray 24 for each picture element of the non-standard image is displayed by the laser source 92 corresponding to that picture element for the principle display point of view 98. The processor 84 ignores any other image and distance value pairs for the picture elements because that image information concerns hidden objects, background behind objects and sides of objects that are not visible in the scene from the principle point of view 20, and thus not visible from the corresponding principle display point of view 98. All image and distance value pairs, including the foregoing ignored image and distance value pairs, however, are processed in accordance with the reverse ray projection process to generate the display image for each of the display points of view 100 corresponding to display elements 82 located away from the location of the principle display point of view 98 where those hidden objects and sides of objects are visible.

Figure 13:
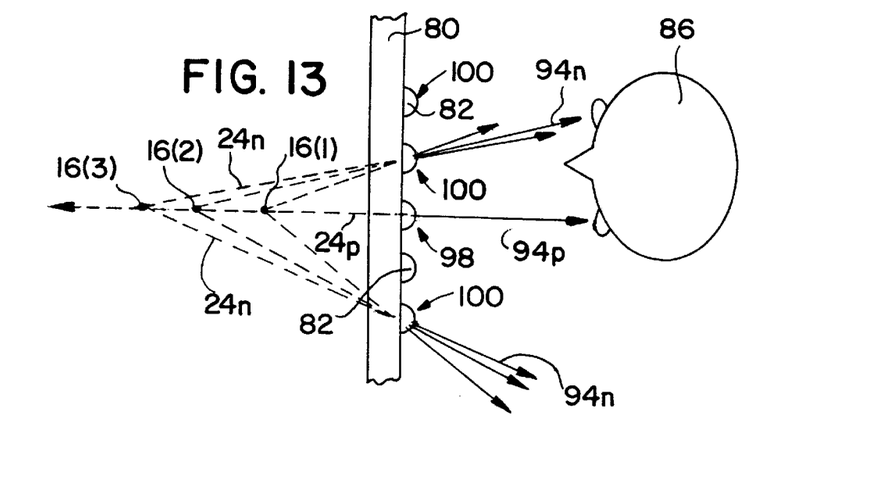
FIG. 13 illustrates the reverse ray projection process utilized to convert principle point of view images to other points of view in the display.

The reverse ray projection process is illustrated in FIG. 13 wherein five display elements 82 in the display panel 80 are shown. To the right of the display panel 80 is shown the location of the viewer 86 positioned in front of and looking at the panel. Display rays 94 are also shown being output from the display elements 82 in the direction of the viewer 86. As mentioned previously, each display element will project, using display rays 94, an image of the scene 14 acquired by the image acquisition device 12 (see FIGS. 1 and 4). Accordingly, because the ideal number of laser sources 92 preferably equals the number of orientations of the scan ray 24, each display ray 94 output from the display elements 82 corresponds inversely with an orientation of the scan ray 24 imaging the scene 14. The scene can therefore be imagined mathematically to exist in three dimensions (as illustrated by broken lines) immediately behind the display panel 80 which then takes on the appearance of a window through which the scene 14 may be viewed.

A better understanding of this effect may be obtained by processing the non-standard image obtained by the image acquisition device 12 of the three objects 16(1)–16(3) in FIG. 5. The non-standard image (FIG. 18) received by the display processor 84 includes a pixel field 204 having image information (image and distance value pairs 212) for each of three objects 16(1)–16(3) located along a particular orientation of principle scan ray 24p. The display element 82 at the principle point of view 98 displays the image information concerning only the nearest object 16(1) visible from that point of view since the other objects 16(2)–16(3) are hidden from the corresponding principle points of view 24 and 98. In accordance with the reverse ray projection process, the measured distances to the objects 16(1)–16(3) from the principle point of view 24 along scan ray 24p are processed to determine, for each of the display points of view 100 away from the principle display point of view 98, and further for each picture element within each of the points of view 98, orientations of the non-principle scan rays 24n to the objects. This is necessary because from the display points of view 100 away from the principle display point of view 98, all of the objects 16(1)–16(3) are visible. Images at each of the display points of view 100 are thus generated picture element by picture element from the received non-standard image to include display rays 94 (forming display images) corresponding inversely to the determined scan rays 24n. This reverse ray projection process is repeated for all of the pixel fields 204 in the image (having the format of FIGS. 16 and 18) to generate an image comprising inversely corresponding display rays 94 for each point of view 100 on the display panel 80, and thus display image information concerning the nearest object, visible from the corresponding point of view 100.

Because adjacent or nearly adjacent display elements 82 display slightly different perspectives of the scene, parallax is induced with respect to the viewer 86 of the display panel 80 giving rise to a three-dimensional effect. As the viewer 86 moves laterally across the display panel 80, different points of view concerning the scene, and thus hidden objects and the sides of objects, are brought into view via the lenses 88 (FIGS. 10–11) to produce a true three-dimensional effect. This is illustrated in FIG. 13 wherein the left and right eyes of the viewer 86 see different images being displayed by the display elements 82 at the points of view 98 and 100 corresponding to the perspective of each eye because different display rays 94 are being viewed through the lenses 88.

Figure 14:
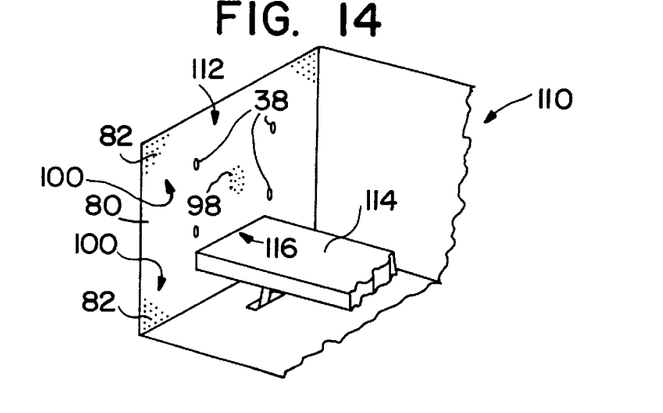
FIG. 14 is an orthogonal view of the installation of the present invention in a room for implementing a teleconferencing application.

Reference is now made to FIG. 14 wherein there is shown an orthogonal view of the installation of the imaging and display system of the present invention in a room 110 for use in a teleconferencing application. The room 110 includes a combination display and imaging wall 112 comprising a plurality of spaced apart stereo cameras 38 mounted within a display panel 80 (including arrayed display elements 82). For teleconferencing purposes, the room 110 includes a conference table 114 having an end 116 abutting against the wall 112. In operation, the stereo cameras 38 function as described above with respect to FIGS. 1–6 to acquire three-dimensional image information concerning the room 110 and the persons located therein (and perhaps seated around the table 114). This image information is transmitted to another location for three dimensional viewing using a display panel 80 comprising all or a portion of a wall 112. Similarly, the other location sends three-dimensional imaging information to the room 110 for viewing by persons in the room using the display panel 80 of the wall 112. If the other location is configured with a similar room size and table shape and position, the display panel 80 will give to viewers in either room the impression of the three-dimensional extension of the table 114 into the wall 112 adjoining to the table in the other location. Three-dimensional viewing of not only the table, but also the persons in the other location is accordingly experienced with the display panel 80. A similar effect is presented to those at the other location with respect to the room 110.

Figure 15A:
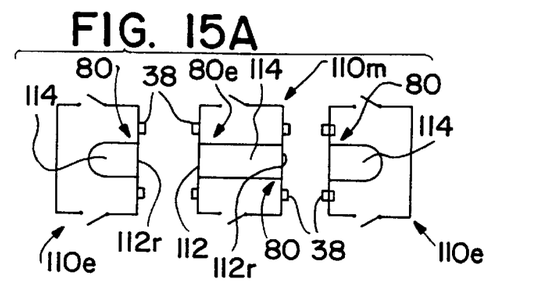
FIGS. 15A and 15B are top down schematic views illustrating the assembly of a plurality of separate rooms in which the present invention is installed to define a "virtual" conference room.

Referring now to FIG. 15A, several rooms 110 equipped with the imaging and display system of the present invention are shown. These rooms are of differing configuration, and are located in a plurality of different locations. End rooms 110e include the conference table 114 abutting into the imaging and display wall 112. The middle room 110m includes a display wall 112 at each end of the conference table 114. Each display wall 112 included in a room 110 comprises a whole wall display panel 80 with included spaced apart stereo cameras 38.

Figure 15B:
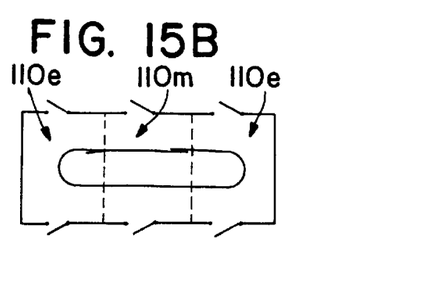

The cameras 38 image their rooms 110 for display on the display panels 80 of the other rooms. For example, the images taken by the stereo cameras 38 of the left end room 100e are displayed by the left display panel 80l of the middle room 100m. This true three-dimensional image of the left end room 100e is included in the image taken by the stereo cameras 38 on the right wall 112r of the middle room 100e and displayed by the display panel 80 of the right end room 110e. By using the various included stereo cameras 38, and displaying the images on the appropriate walls 112 of the rooms 110, a "virtual" conference room 116, as shown in FIG. 15B, is generated wherein an appearance of one large conference room is presented to the persons located in the various included rooms 110 due to the true three-dimensional imaging and display capabilities of the system of the present invention. It will, of course, be understood that the individual rooms and the virtual conference room can take on any one of a number of shapes.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A data format for conveying true three-dimensional image information, comprising:

a frame of image data for each true three-dimensional image of a scene containing objects;

a pixel field in the frame of image data for each picture element in the true three-dimensional image, each picture element corresponding to an orientation of a scan ray emanating from a principle point of view; and an image and distance value pair in each pixel field for each one of a plurality of objects in the scene located along the orientation of the scan ray corresponding to the picture element for that pixel field, each included image and distance value pair for one pixel field providing image data for a certain one of the objects and distance data to that certain object along the scan ray.

2. A data format for conveying true three-dimensional video image information, comprising:

a sequence of frames of image data, one frame per individual image in a video image taken of a scene containing objects;

a plurality of pixel fields in each frame, each pixel field associated with a picture element in the image, each picture element corresponding to an orientation of a scan ray emanating from a principle point of view; and an image and distance value pair in each pixel field for each one of a plurality of objects in the scene located along the orientation of the scan ray corresponding to the picture element for that pixel field, each included image and distance value pair for one pixel field providing image data for a certain one of the objects and distance data to that certain object along the scan ray.

3. The format of claim 2 wherein the frames in the sequence of frames comprise full frames containing a pixel field for each picture element in the image.

4. The format of claim 2 wherein the frames in the sequence of frames comprise:

full frames each containing a pixel field for each picture element in the image; and partial frames between consecutive full frames, each partial frame containing a pixel field for each picture element in the image which has changed from an immediately prior image in the sequence.

* * * * *